(12) United States Patent
Peng et al.

(10) Patent No.: US 12,198,421 B2
(45) Date of Patent: Jan. 14, 2025

(54) TRAINING METHOD OF UNDERWATER SEA URCHIN IMAGE RECOGNITION MODEL, AND UNDERWATER SEA URCHIN IMAGE RECOGNITION METHOD AND DEVICE

(71) Applicant: Guangdong Ocean University, Zhanjiang (CN)

(72) Inventors: Xiaohong Peng, Zhanjiang (CN); Zixiang Liang, Zhongshan (CN); Sidong Li, Zhanjiang (CN); Liang Chen, Zhanjiang (CN); Jun Zhang, Lanzhou (CN); Yifan Li, Anyang (CN); Xiaopeng Zhao, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 193 days.

(21) Appl. No.: 18/107,418

(22) Filed: Feb. 8, 2023

(65) Prior Publication Data
US 2024/0020966 A1 Jan. 18, 2024

Related U.S. Application Data

(63) Continuation of application No. PCT/CN2022/101036, filed on Jun. 24, 2022.

(30) Foreign Application Priority Data

May 31, 2022 (CN) .......................... 202210605189.1

(51) Int. Cl.
*G06V 10/80* (2022.01)
*G06V 10/36* (2022.01)
(Continued)

(52) U.S. Cl.
CPC .............. *G06V 20/05* (2022.01); *G06V 10/36* (2022.01); *G06V 10/774* (2022.01); *G06V 10/80* (2022.01); *G06V 40/10* (2022.01)

(58) Field of Classification Search
CPC .... G06V 10/764; G06V 30/10; G06T 7/0004; G05B 19/418
See application file for complete search history.

(56) References Cited

U.S. PATENT DOCUMENTS 10,922,549 B2 * 2/2021 Mallet .................... G06V 40/10
12,093,616 B1 * 9/2024 Xiang ...................... G06N 7/01
(Continued)

OTHER PUBLICATIONS

Guan et al. "Research on Underwater Target Recognition Technology Based on Neural Network", Wireless Communications and Mobile Computing vol. 2022 published Apr. 14, 2022 (Year: 2022).*
(Continued)

*Primary Examiner* — Ming Y Hon
(74) *Attorney, Agent, or Firm* — Hemisphere Law, PLLC; Zhigang Ma

(57) ABSTRACT

A training method of underwater sea urchin image recognition model, and underwater sea urchin image recognition method and device are provided. The training method includes: constructing an underwater sea urchin image recognition model, acquiring an underwater sea urchin image dataset; performing MSRCR on the underwater sea urchin image dataset; processing the underwater sea urchin image dataset by a dark channel prior method; performing image fusion to obtain a fused image dataset; sharpening the fused image dataset to obtain a training image dataset; and training the underwater sea urchin image recognition model by using the training image dataset. By performing MSRCR and dark channel prior processing on the image, and then performing image fusion and sharpening based on a point sharpness
(Continued)

weighting method, the quality of image is improved, and an accuracy of subsequent sea urchin object detection is improved.

7 Claims, 5 Drawing Sheets

(51) Int. Cl.
  *G06V 10/774* (2022.01)
  *G06V 20/05* (2022.01)
  *G06V 40/10* (2022.01)

(56) References Cited

U.S. PATENT DOCUMENTS

| | | | |
|---|---|---|---|
| 2021/0221479 A1* | 7/2021 | Yu | G01N 33/18 |
| 2021/0329892 A1* | 10/2021 | Kozachenok | A01K 61/95 |
| 2024/0005626 A1* | 1/2024 | Zhang | G06V 10/806 |

OTHER PUBLICATIONS

Guizhou Ocean University (Applicant), Claims (allowed) of CN202210605189.1, Jul. 14, 2022.
CNIPA, Notification to grant patent right for invention in CN202210605189.1, Jul. 27, 2022.

\* cited by examiner

TRAINING METHOD OF UNDERWATER SEA URCHIN IMAGE RECOGNITION MODEL, AND UNDERWATER SEA URCHIN IMAGE RECOGNITION METHOD AND DEVICE

TECHNICAL FIELD

The disclosure relates to the field of underwater image object detection, in particularly to a training method of underwater sea urchin image recognition model, and underwater sea urchin image recognition method and device.

BACKGROUND

With the continuous development of artificial intelligence technology, the artificial intelligence technology has also been applied to automatic fishing of underwater sea urchins. A most part of the automatic fishing of underwater sea urchins is underwater urchin object detection. Because of complex underwater environment and low light intensity, underwater sea urchin images usually have a series of problems, such as blurring, low contrast and chromatic aberration. Common object recognition and detection methods, such as SSD (abbreviation for Single Shot Multibox Detector), YOLO (abbreviation for You Only Look Once) and so on, have good detection accuracy in the land environment, but cannot cope with the complex underwater environment well.

SUMMARY

In view of the problems in the prior art, the disclosure provides a training method of underwater sea urchin image recognition model, and a recognition method and a recognition device of underwater sea urchin image, so as to solve a series of problems existing in the detection of underwater sea urchins, such as blurring, low contrast, chromatic aberration and the like of underwater sea urchin images.

According to a first technical solution of the disclosure, a training method of underwater sea urchin image recognition model is provided. The training method includes: constructing an underwater sea urchin image recognition model, acquiring an underwater sea urchin image dataset, performing multi-scale retinex with color restoration (MSRCR) on the underwater sea urchin image dataset, processing the underwater sea urchin image dataset by a dark channel prior method, performing image fusion on the underwater sea urchin image dataset performed with the MSRCR and the underwater sea urchin image dataset processed by the dark channel prior method to obtain a fused image dataset, sharpening the fused image dataset to obtain a training image dataset, and training the underwater sea urchin image recognition model by using the training image dataset.

According to a second technical solution of the disclosure, an underwater sea urchin image recognition method is provided. The recognition method includes: recognizing an underwater sea urchin image by using a trained underwater sea urchin image recognition model obtained by the training method according to any embodiment of the disclosure.

According to a third technical solution of the disclosure, a training device of underwater sea urchin image recognition model is provided. The training device includes a processor, and the processor is configured (i.e., structured and arranged) to: construct an underwater sea urchin image recognition model, acquire an underwater sea urchin image dataset, perform multi-scale retinex with color restoration (MSRCR) on the underwater sea urchin image dataset, process the underwater sea urchin image dataset by a dark channel prior method, perform image fusion on the underwater sea urchin image dataset performed with the MSRCR and the underwater sea urchin image dataset processed by the dark channel prior method to obtain a fused image dataset, sharpen the fused image dataset to obtain a training image dataset, and train the underwater sea urchin image recognition model by using the training image dataset.

According to a fourth technical solution of the disclosure, an underwater sea urchin image recognition device is provided. The recognition device includes a processor, and the processor is configured to: recognize an underwater sea urchin image by using a trained underwater sea urchin image recognition model obtained by the training method according to any embodiment of the disclosure.

According to a fifth technical solution of the disclosure, a non-transitory computer readable storage medium stored with instructions is provided. The instructions, when executed by a processor, perform the training method or the underwater sea urchin image recognition method according to any claim of the disclosure.

The training method of underwater sea urchin image recognition model, and the underwater sea urchin image recognition method and recognition device according to various embodiments of the disclosure, by performing multi-scale retinex with color restoration (abbreviated as MSRCR) and dark channel prior processing on the image(s), and then performing image fusion and sharpening based on a point sharpness weighting method, the quality of image(s) is improved, and an accuracy of subsequent sea urchin object detection is improved.

BRIEF DESCRIPTION OF DRAWINGS

In drawings which are not necessarily drawn to scale, the same reference numerals may describe similar components in different drawings. The same reference numerals with a letter suffix or different letter suffixes may refer to different examples of similar components. The drawings generally illustrate various embodiments by way of example rather than limitation, and are used to illustrate embodiments of the disclosure together with the specification and claims. Where appropriate, the same reference numerals are used throughout the drawings to refer to the same or similar parts. Such embodiments are illustrative and are not intended to be exhaustive or exclusive embodiments of the device or the methods of the disclosure.

DETAILED DESCRIPTION OF EMBODIMENTS

In order for those skilled in the art to better understand technical solutions of the disclosure, the disclosure will be described in detail below in combination with the accompanying drawings and concrete implementation modes. Embodiments of the disclosure will be described in further detail below with reference to the accompanying drawings and concrete embodiments, but not as a limitation of the disclosure. The order of steps described in the specification as an example should not be construed as a limitation if there is no necessity of a contextual relationship between them, and those skilled in the art should know that the order can be adjusted, as long as the logic between them is not destroyed to avoid the whole process cannot be realized.

Figure 1:
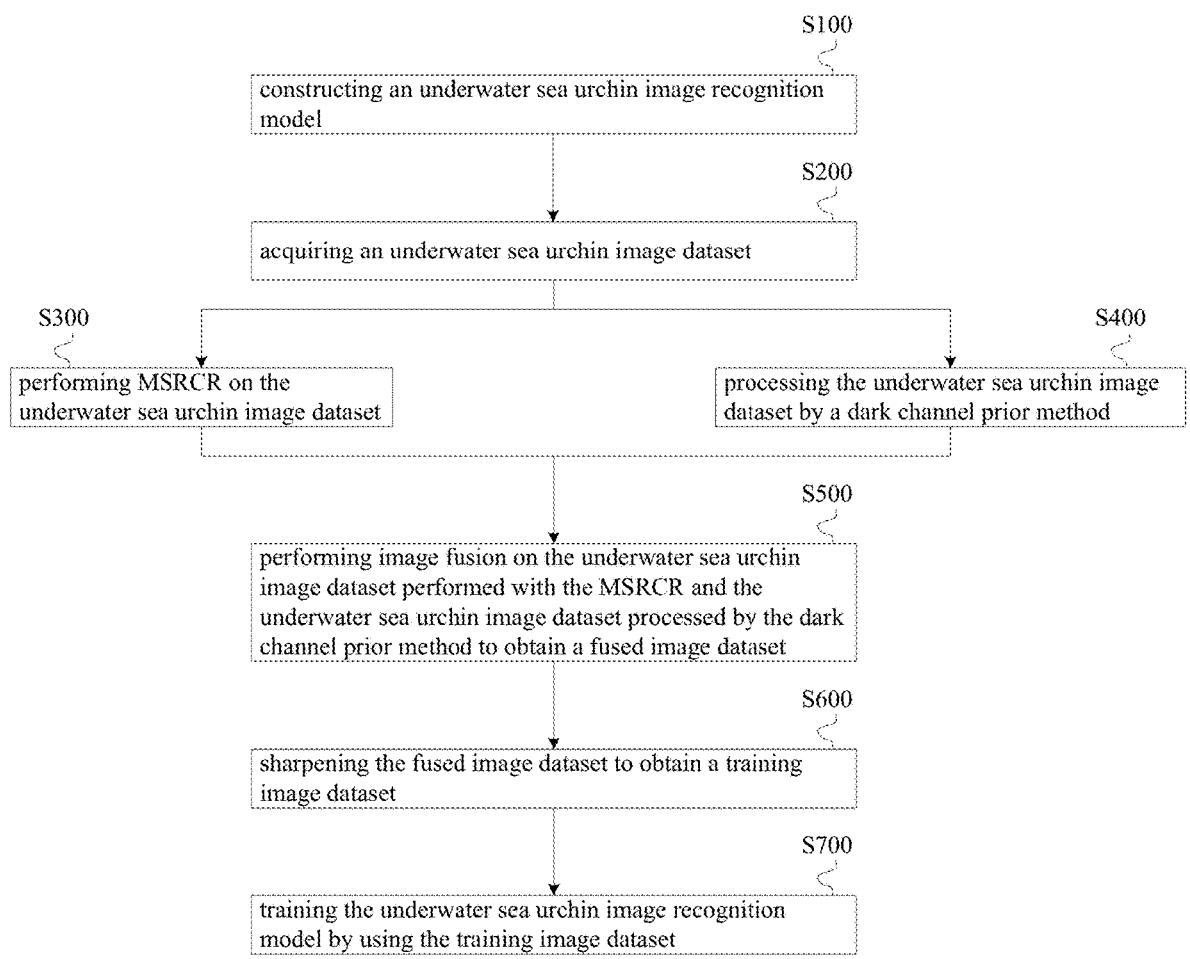
FIG. 1 illustrates schematic flowchart of a training method of underwater sea urchin image recognition model according to an embodiment of the disclosure.

An embodiment of the disclosure provides a training method of underwater sea urchin image recognition model. Referring to FIG. 1, which illustrates a schematic flowchart of the training method of underwater sea urchin image recognition model according to the embodiment of the disclosure. The training method includes the following step S100 through step S700.

Step S100, constructing an underwater sea urchin image recognition model.

Figure 2:
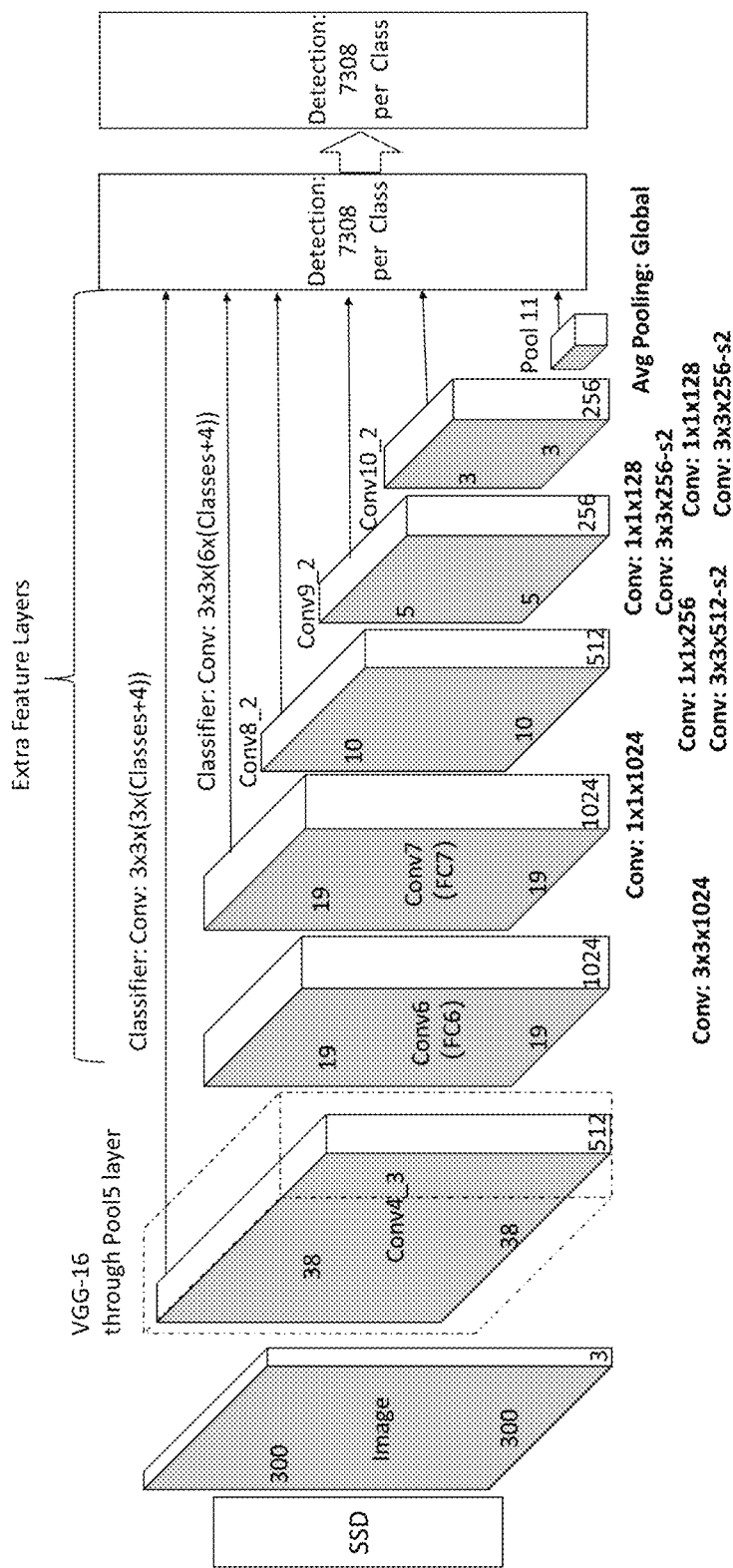
FIG. 2 illustrates a schematic network structure diagram of an SSD model according to an embodiment of the disclosure.

In some embodiments, as illustrated in FIG. 2, which is a schematic diagram of the underwater sea urchin image recognition model. The underwater sea urchin image recognition model is based on an SSD model and constructed by the method as follows: a feature extraction part of the SSD (abbreviation for Single Short Multibox Detector) uses a convolutional layer of VGG (abbreviation for Visual Geometry Group), two fully-connected layers of the VGG are converted into ordinary convolutional layers, and multiple convolutional layers are connected to a final detection classification layer for regression. The SSD model constructed in the illustrated embodiment of the disclosure is SSD 300, a size of an input image is 300×300, the feature extraction part uses a convolutional layer of VGG-16, and two fully-connected layers of the VGG-16 are converted into ordinary convolutional layers (e.g., Conv6 and Conv7 as shown in FIG. 2). Afterwards, multiple convolutions (Conv8_2, Conv9_2, Conv10_2) are connected, and finally a Global Average Pool is used to turn it into a 1×1 output (Pool 11). As seen from FIG. 2, the SSD connects Conv4_3, Conv7, Conv8_2, Conv9_2, Conv10_2 and Pool 11 to the final detection classification layer for regression.

Step S200, acquiring an underwater sea urchin image dataset. It should be noted that the underwater sea urchin image dataset includes at least one underwater sea urchin image, which can be formed by acquiring an existing underwater sea urchin image(s), or be obtained by field collection. For example, the underwater sea urchin image dataset is formed by underwater acquiring a corresponding underwater sea urchin image(s) through an acquisition terminal. The acquisition terminal can be a special underwater imaging device, which is used to underwater acquire multiple (i.e., more than one) underwater sea urchin images or an underwater sea urchin video. When the underwater sea urchin video is acquired, the video can be extracted frame by frame to obtain multiple video frames, and each the video frame is one underwater sea urchin image. The above acquisition method of underwater sea urchin image dataset is exemplary, and in actual applications, it includes but is not limited to the acquisition method described above.

Step S300, performing multi-scale retinex with color restoration (abbreviated as MSRCR) on the underwater sea urchin image dataset.

Figure 3:
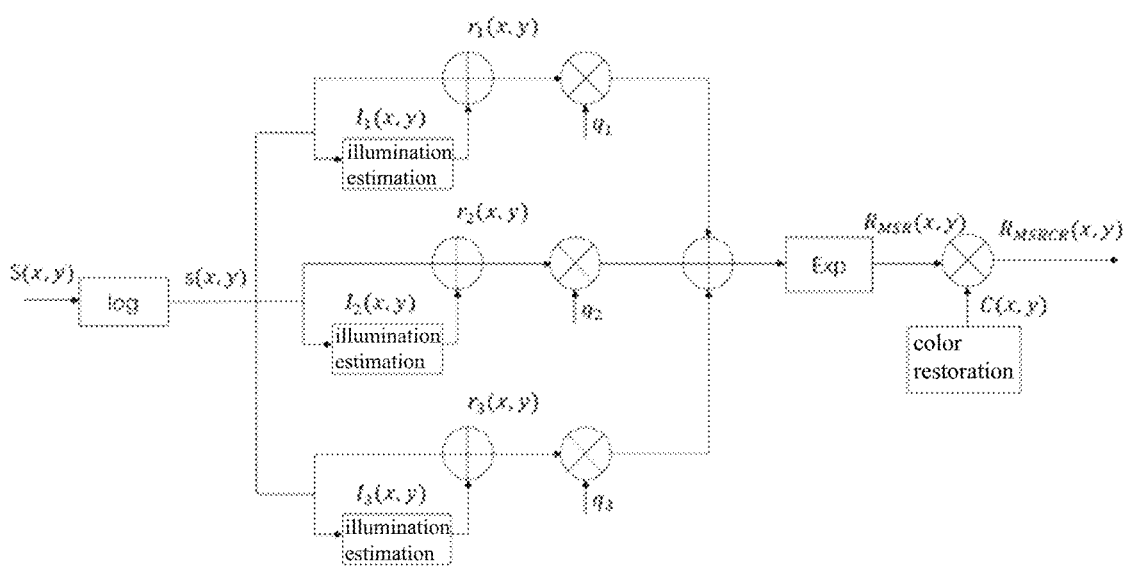
FIG. 3 illustrates a schematic flowchart of a multi-scale color restoration algorithm according to an embodiment of the disclosure.

In some embodiments, as illustrated in FIG. 3, which is a schematic flowchart of performing MSRCR on the underwater sea urchin image dataset. In particular, the underwater sea urchin image dataset is performed with the MSRCR by the following formula (1).

$$r_{i \in \{r,g,b\}}(x,y) = C_i(x,y) \cdot (\Sigma_{k=1}^{N} \omega_k (\log I_i(x,y) - \log(F_k(x,y) \cdot I_i(x,y))))$$  Formula (1)

where, $r_{i \in \{r,g,b\}}(x, y)$ represents a reflection component of a channel; $C_i(x, y)$ represents a color restoration factor of the channel, and an expression of $C_i(x, y)$ is shown as the following formula (2); N represents the number of scales and generally has a value of 3; $\omega_k$ represents a weighting coefficient of a k-th scale, and $\Sigma_{k=1}^{N} \omega_k = 1$; $I_i(x,y)$ represents a i-th channel of an original image; $F_k(x, y)$ represents a Gaussian filter function on the k-th scale, and an expression of $F_k(x, y)$ is shown as the following formula (3).

$$C_i(x,y) = \beta(\log(\alpha I_i(x,y)) - \log(\Sigma_{i \in \{r,g,b\}} I_i(x,y)))$$  Formula (2)

where, $\beta$ represents a gain constant and generally has a value of 46, the value of $\alpha$ controls a strength of nonlinearity and generally has a value of 125.

$$F_k(x, y) = \frac{1}{\sqrt{2\pi}\sigma_k} \exp\left(-\frac{x^2 + y^2}{2\sigma_k^2}\right)$$  Formula (3)

where, $\sigma_k$ represents a scale parameter of a Gaussian surround function on the k-th scale.

Step S400, processing the underwater sea urchin image dataset by a dark channel prior method. The dark channel prior method is a conventional method in the field of image processing, and thus the illustrated embodiment will not be described in detail herein.

Step S500, performing image fusion on the underwater sea urchin image dataset performed with the MSRCR and the underwater sea urchin image dataset processed by the dark channel prior method to obtain a fused image dataset.

Figure 4:
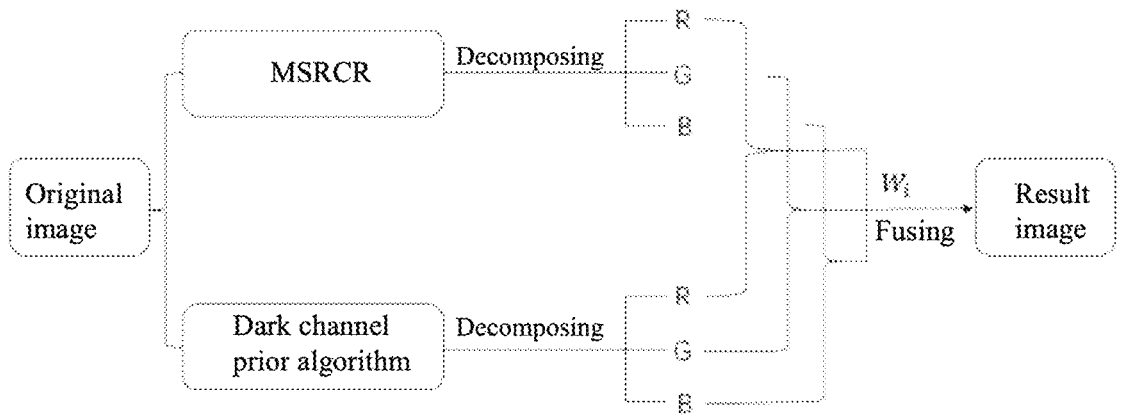
FIG. 4 illustrates schematic diagram of an image fusion algorithm based on point sharpness weighting according to an embodiment of the disclosure.
Figure 5:
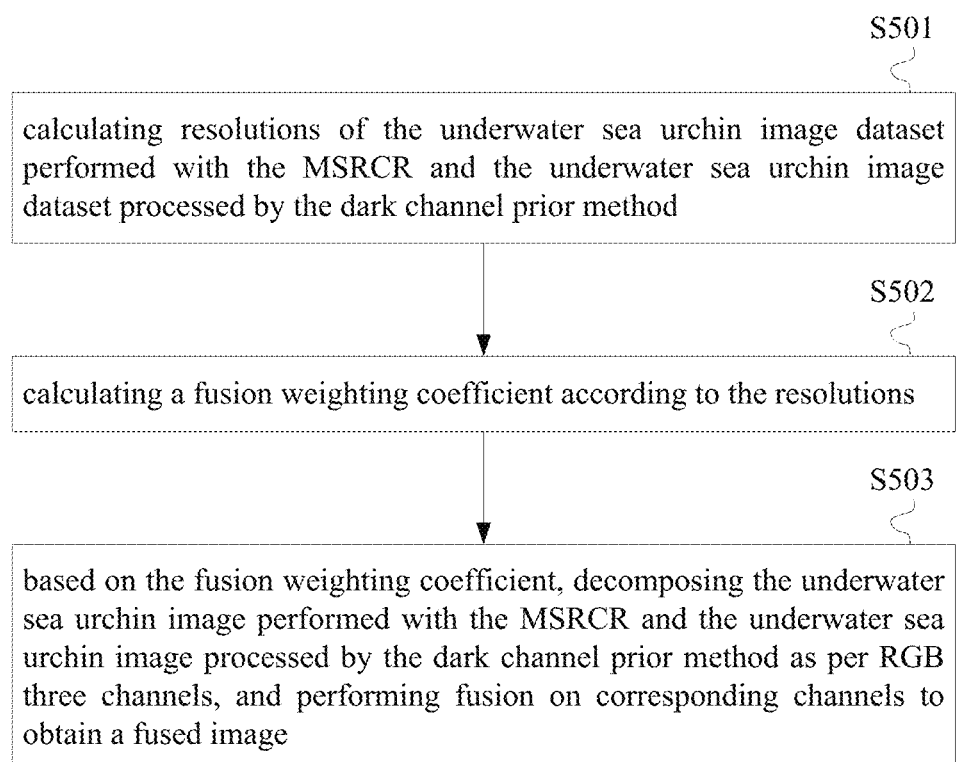
FIG. 5 illustrates a schematic flowchart of the image fusion algorithm based on point sharpness weighting according to an embodiment of the disclosure

In some embodiments, as illustrated in FIG. 4 and FIG. 5, the performing image fusion on the underwater sea urchin image dataset performed with the MSRCR and the underwater sea urchin image dataset processed by the dark channel prior method includes the following sub-steps S501 through S503.

Sub-step S501, calculating resolutions of the underwater sea urchin image dataset performed with the MSRCR and the underwater sea urchin image dataset processed by the dark channel prior method.

In some embodiments, the resolutions of the underwater sea urchin image dataset performed with the MSRCR and the underwater sea urchin image dataset processed by the dark channel prior method are calculated through the following formula (4).

$$p = \frac{\sum_{i=1}^{M \times N} \sum_{j=1}^{8} |dI/dx|}{M \times N}$$  Formula (4)

where, M represents a row number of image, N represents a column number of image, p represents the resolution of image, dI represents a magnitude of image grayscale variation, dx represents a variation of image pixel pitch.

Sub-step S502, calculating a fusion weighting coefficient according to the resolutions.

In some embodiments, the fusion weighting coefficient is calculated by the following formula (5).

$$W_i = \frac{p_i}{p_i + p_j} \qquad \text{Formula (5)}$$

where, $p_i$ represents the resolution of current image, $p_j$ represents the resolution of the other image, and $W_i$ represents the fusion weighting coefficient.

Sub-step S503, based on the fusion weighting coefficient, decomposing the underwater sea urchin image performed with the MSRCR and the underwater sea urchin image processed by the dark channel prior method as per RGB three channels, and performing fusion on corresponding channels to obtain a fused image.

Step S600, sharpening the fused image dataset to obtain a training image dataset.

In some embodiments, Gaussian filtering is performed on the fused image obtained in step S500, and then pixel values of current image and results obtained after the Gaussian filtering are subtracted and mapped to 0-255, as shown in the following formula (6):

$$g(i, j) = F(i, j) - \frac{\omega \cdot Highpass(F(i, j))}{1 - \omega} \qquad \text{Formula (6)}$$

where, $g(i, j)$ represents a result image after sharping, $F(i, j)$ represents an original image, $Highpass(F(i,j))$ represents a Gaussian blur processed image, $\omega$ represents a sharpness adjustment parameter and generally has a value of 0.6. By using the above method to sharpen the image, the noise of image is reduced, and a certain image smoothing effect can be achieved.

Step S700, training the underwater sea urchin image recognition model by using the training image dataset. As a result, a trained underwater sea urchin image recognition model is obtained.

An embodiment of the disclosure provides an underwater sea urchin image recognition method, and the recognition method includes: recognizing an underwater sea urchin image by using the trained underwater sea urchin image recognition model obtained by the training method according to any one of the above embodiments of the disclosure.

Figure 6:
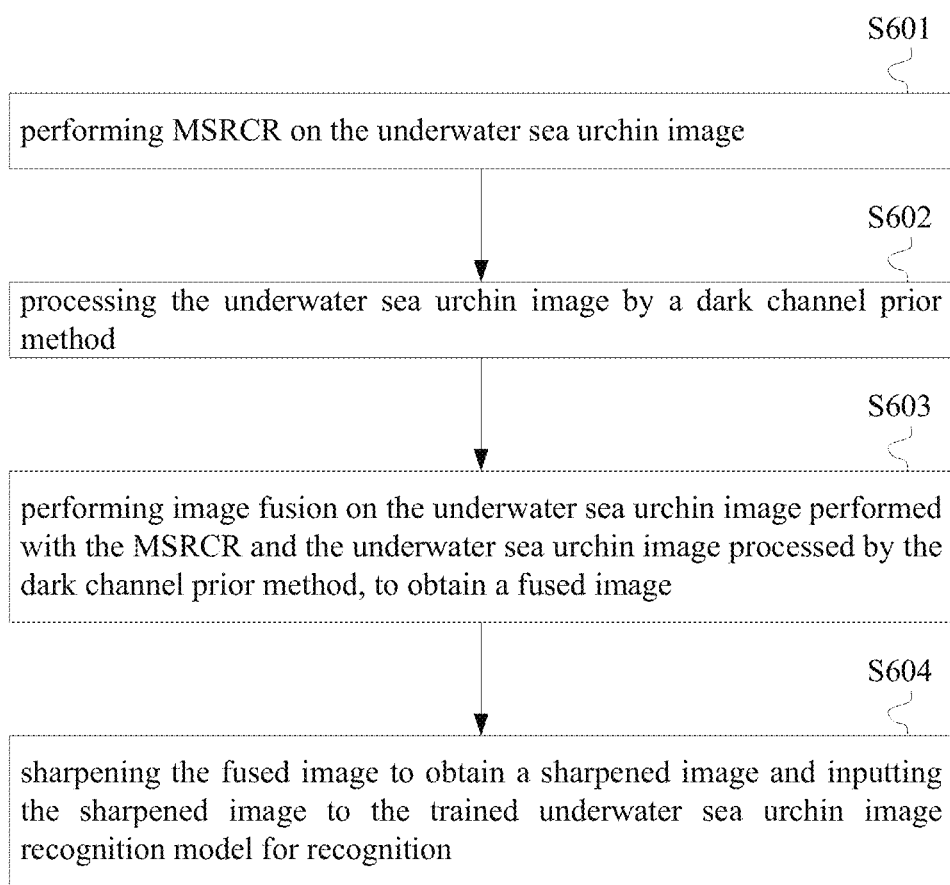
FIG. 6 illustrates a schematic flowchart of an object detection of underwater sea urchin image according to an embodiment of the disclosure.

In some embodiments, as illustrated in FIG. 6, which is a schematic flowchart of the underwater sea urchin image recognition method. Specifically, the underwater sea urchin image recognition method includes the following steps S601 through S604.

Step S601, performing MSRCR on the underwater sea urchin image. In particular, this step can be realized by the above formulas (1) through (3).

Step S602, processing the underwater sea urchin image by a dark channel prior method.

Step S603, performing image fusion on the underwater sea urchin image performed with the MSRCR and the underwater sea urchin image processed by the dark channel prior method to obtain a fused image. In particular, this step can be realized by the above formulas (4) and (5).

Step S604, sharpening the fused image to obtain a sharpened image and inputting the sharpened image to the trained underwater sea urchin image recognition model for recognition. In particular, this step can be realized by the above formula (6).

An embodiment of the disclosure provides a training device of underwater sea urchin image recognition model. The training device includes a processor. The processor is configured (i.e., structured and arranged) to: construct an underwater sea urchin image recognition model, acquire an underwater sea urchin image dataset, perform multi-scale retinex with color restoration (abbreviated as MSRCR) on the underwater sea urchin image dataset, process the underwater sea urchin image dataset by a dark channel prior method, perform image fusion on the underwater sea urchin image dataset performed with the MSRCR and the underwater sea urchin image dataset processed by the dark channel prior method to obtain a fused image dataset, sharpen the fused image dataset to obtain a training image dataset, and train the underwater sea urchin image recognition model by using the training image dataset.

In some embodiments, the processor is concretely configured to: perform the MSRCR on the underwater sea urchin image dataset through the following formula (1).

$$r_{i \in \{r,g,b\}}(x,y) = C_i(x,y) \cdot (\Sigma_{k=1}^{N} \omega_k (\log I_i(x,y) - \log(F_k(x,y) \cdot I_i(x,y)))) \qquad \text{Formula (1)}$$

where, $r_{i \in \{r,g,b\}}(x, y)$ represents a reflection component of a channel; $C_i(x, y)$ represents a color restoration factor of the channel, and an expression of $C_i(x, y)$ is shown as the following formula (2); N represents the number of scales and generally has a value of 3; $\omega_k$ represents a weighting coefficient of a k-th scale, and $\Sigma_{k=1}^{N} \omega_k = 1$; $I_i(x,y)$ represents a i-th channel of an original image; $F_k(x, y)$ represents a Gaussian filter function on the k-th scale, and an expression of $F_k(x, y)$ is shown as the following formula (3).

$$C_i(x,y) = \beta(\log(\alpha I_i(x,y)) - \log(\Sigma_{i \in \{r,g,b\}} I_i(x,y))) \qquad \text{Formula (2)}$$

where, $\beta$ represents a gain constant and generally has a value of 46, the value of a controls a strength of nonlinearity and generally has a value of 125.

$$F_k(x, y) = \frac{1}{\sqrt{2\pi}\sigma_k} \exp\left(-\frac{x^2 + y^2}{2\sigma_k^2}\right) \qquad \text{Formula (3)}$$

where, $\sigma_k$ represents a scale parameter of a Gaussian surround function on the k-th scale.

In some embodiments, the processor is concretely configured to: calculate resolutions of the underwater sea urchin image dataset performed with the MSRCR and the underwater sea urchin image dataset processed by the dark channel prior method; calculate a fusion weighting coefficient according to the resolutions; and based on the fusion weighting coefficient, decompose the underwater sea urchin image performed with the MSRCR and the underwater sea urchin image processed by the dark channel prior method as per RGB three channels, and perform fusion on corresponding channels to obtain a fused image.

In some embodiments, the processor is concretely configured to: calculate resolutions of the underwater sea urchin image dataset performed with the MSRCR and the underwater sea urchin image dataset processed by the dark channel prior method through the following formula (4).

$$p = \frac{\sum_{i=1}^{M \times N} \sum_{j=1}^{8} |dI/dx|}{M \times N} \qquad \text{Formula (4)}$$

where, M represents a row number of image, N represents a column number of image, p represents the resolution of image, dI represents a magnitude of image grayscale variation, dx represents a variation of image pixel pitch.

In some embodiments, the processor is concretely configured to: calculate a fusion weighting coefficient according to the resolutions through the following formula (5).

$$W_i = \frac{p_i}{p_i + p_j} \quad \text{Formula (5)}$$

where, $p_i$ represents the resolution of current image, $p_j$ represents the resolution of the other image, and $W_i$ represents the fusion weighting coefficient.

An embodiment of the disclosure provides an underwater sea urchin image recognition device. The recognition device includes a processor, and the processor is configured to: recognize an underwater sea urchin image by using the trained underwater sea urchin image recognition model obtained by the training method according to any one of the above embodiments of the disclosure.

In some embodiments, the processor is concretely configured to: perform MSRCR on the underwater sea urchin image; process the underwater sea urchin image by a dark channel prior method; perform image fusion on the underwater sea urchin image performed with the MSRCR and the underwater sea urchin image processed by the dark channel prior method, to obtain a fused image; and sharpen the fused image to obtain a sharpened image and input the sharpened image to the trained underwater sea urchin image recognition model for recognition.

An embodiment of the disclosure further provides a non-transitory computer readable storage medium stored with instructions, the instructions, when are executed by a processor, perform the training method or the recognition method according to any one of the above embodiments of the disclosure.

Moreover, although exemplary embodiments have been described herein, the scope of the disclosure includes any and all embodiments having equivalent elements, modifications, omissions, combinations (e.g., intersections of the various embodiments), adaptations, or changes based on the disclosure. Elements in the claims are to be interpreted broadly based on the language employed in the claims and are not to be limited to the examples described in this specification or during the practice of this application, and the examples are to be construed as non-exclusive. Accordingly, the specification and examples are intended to be considered as examples only, true scope and spirit are indicated by the appended claims along with their full scope of equivalents.

The foregoing description is intended to be illustrative and not restrictive. For example, the above examples (or one or more solutions thereof) may be used in combination with each other. For example, other embodiments may be used by those of ordinary skill in the art upon reading the above description. In addition, In the embodiments described above, various features may be grouped together to simplify the disclosure. This is not to be construed as an intention that features of the disclosure that are not claimed are essential to any claim. On the contrary, the subject matter of the disclosure may be less than all of features of a particular embodiment of the disclosure. Thus, the following claims are hereby incorporated into the detailed description as examples or embodiments, with each claim standing alone as an independent embodiment, and it is contemplated that these embodiments may be combined with one another in various combinations or permutations. The scope of protection of the disclosure should be determined by reference to the full scope of the appended claims and equivalent forms thereof.

What is claimed is:

1. A training method of underwater sea urchin image recognition model, comprising:
   constructing an underwater sea urchin image recognition model;
   acquiring an underwater sea urchin image dataset;
   performing multi-scale retinex with color restoration (MSRCR) on the underwater sea urchin image dataset;
   processing the underwater sea urchin image dataset by a dark channel prior method;
   performing image fusion on the underwater sea urchin image dataset performed with the MSRCR and the underwater sea urchin image dataset processed by the dark channel prior method to obtain a fused image dataset;
   sharpening the fused image dataset to obtain a training image dataset;
   training the underwater sea urchin image recognition model by using the training image dataset;
   wherein the performing image fusion on the underwater sea urchin image dataset performed with the MSRCR and the underwater sea urchin image dataset processed by the dark channel prior method to obtain a fused image dataset, comprises:
   calculating resolutions of the underwater sea urchin image dataset performed with the MSRCR and the underwater sea urchin image dataset processed by the dark channel prior method;
   calculating a fusion weighting coefficient according to the resolutions;
   based on the fusion weighting coefficient, decomposing the underwater sea urchin image performed with the MSRCR and the underwater sea urchin image processed by the dark channel prior method as per red (R), green (G) and blue (B) three channels, and performing fusion on corresponding channels to obtain a fused image;
   wherein the resolutions of the underwater sea urchin image dataset performed with the MSRCR and the underwater sea urchin image dataset processed by the dark channel prior method are calculated through the following formula (4):

$$p = \frac{\sum_{i=1}^{M \times N} \sum_{j=1}^{8} |dI/dx|}{M \times N}; \quad \text{Formula (4)}$$

where M represents a row number of image, N represents a column number of image, p represents a resolution of image, dI represents a magnitude of image grayscale variation, dx represents a variation of image pixel pitch;
wherein the fusion weighting coefficient is calculated through the following formula (5):

$$W_i = \frac{p_i}{p_i + p_j}; \quad \text{Formula (5)}$$

where $p_i$ represents a resolution of current image, $p_j$ represents a resolution of another image, and $W_i$ represents the fusion weighting coefficient.

2. The training method according to claim 1, wherein the underwater sea urchin image dataset is performed with the MSRCR through the following formula (1):

$$r_{i \in \{r,g,b\}}(x,y) = C_i(x,y) \cdot (\Sigma_{k=1}^{N} \omega_k (\log I_i(x,y) - \log(F_k(x,y) \cdot I_i(x,y)))) \quad \text{Formula (1);}$$

where $r_{i \in \{r,g,b\}}(x, y)$ represents a reflection component of a channel; $C_i(x, y)$ represents a color restoration factor of the channel, and an expression of $C_i(x, y)$ is shown as the following formula (2); N represents the number of scales and has a value of 3; $\omega_k$ represents a weighting coefficient of a k-th scale, and $\Sigma_{k=1}^{N} \omega_k = 1$; $I_i(x, y)$ represents a i-th channel of an original image; $F_k(x, y)$ represents a Gaussian filter function on the k-th scale, and an expression of $F_k(x, y)$ is shown as the following formula (3);

$$C_i(x,y) = \beta(\log(\alpha I_i(x,y)) - \log(\Sigma_{i \in \{r,g,b\}} I_i(x,y))) \quad \text{Formula (2)}$$

where β represents a gain constant and has a value of 46, a value of α controls a strength of nonlinearity and has a value of 125, $$F_k(x, y) = \frac{1}{\sqrt{2\pi}\,\sigma_k} \exp\left(-\frac{x^2 + y^2}{2\sigma_k^2}\right) \quad \text{Formula (3)}$$

where $\sigma_k$ represents a scale parameter of a Gaussian surround function on the k-th scale.

3. An underwater sea urchin image recognition method, comprising:
recognizing an underwater sea urchin image by using a trained underwater sea urchin image recognition model obtained by the training method according to claim 1.

4. The underwater sea urchin image recognition method according to claim 3, specifically comprising:
performing MSRCR on the underwater sea urchin image;
processing the underwater sea urchin image by a dark channel prior method;
performing image fusion on the underwater sea urchin image performed with the MSRCR and the underwater sea urchin image processed by the dark channel prior method to obtain a fused image;
sharpening the fused image to obtain a sharpened image and inputting the sharpened image to the trained underwater sea urchin image recognition model for recognition.

5. A non-transitory computer readable storage medium stored with instructions, wherein the instructions, when executed by a processor, perform the underwater sea urchin image recognition method according to claim 3.

6. An underwater sea urchin image recognition device, comprising a processor; wherein the processor is configured to: recognize an underwater sea urchin image by using a trained underwater sea urchin image recognition model obtained by the training method according to claim 1.

7. A training device of underwater sea urchin image recognition model, comprising a processor; wherein the processor is configured to:
construct an underwater sea urchin image recognition model;
acquire an underwater sea urchin image dataset;
perform multi-scale retinex with color restoration (MSRCR) on the underwater sea urchin image dataset;
process the underwater sea urchin image dataset by a dark channel prior method;
perform image fusion on the underwater sea urchin image dataset performed with the MSRCR and the underwater sea urchin image dataset processed by the dark channel prior method to obtain a fused image dataset;
sharpen the fused image dataset to obtain a training image dataset;
train the underwater sea urchin image recognition model by using the training image dataset;
calculate resolutions of the underwater sea urchin image dataset performed with the MSRCR and the underwater sea urchin image dataset processed by the dark channel prior method;
calculate a fusion weighting coefficient according to the resolutions;
based on the fusion weighting coefficient, decompose the underwater sea urchin image performed with the MSRCR and the underwater sea urchin image processed by the dark channel prior method as per red (R), green (G) and blue (B) three channels, and perform fusion on corresponding channels to obtain a fused image;
wherein the resolutions of the underwater sea urchin image dataset performed with the MSRCR and the underwater sea urchin image dataset processed by the dark channel prior method are calculated through the following formula (4):

$$p = \Sigma_{i=1}^{M \times N} \Sigma_{j=1}^{8} |dI/dx|/M \times N \quad \text{Formula (4);}$$

where M represents a row number of image, N represents a column number of image, p represents a resolution of image, dI represents a magnitude of image grayscale variation, dx represents a variation of image pixel pitch;
wherein the fusion weighting coefficient is calculated through the following formula (5);

$$W_i = p_i / p_i + p_j \quad \text{Formula (5);}$$

where $p_i$ represents a resolution of current image, $p_j$ represents a resolution of another image, and $W_i$ represents the fusion weighting coefficient.

\* \* \* \* \*